Aug. 30, 1932.  K. E. LYMAN  1,875,064
BRAKE
Filed Aug. 20, 1927    4 Sheets-Sheet 1
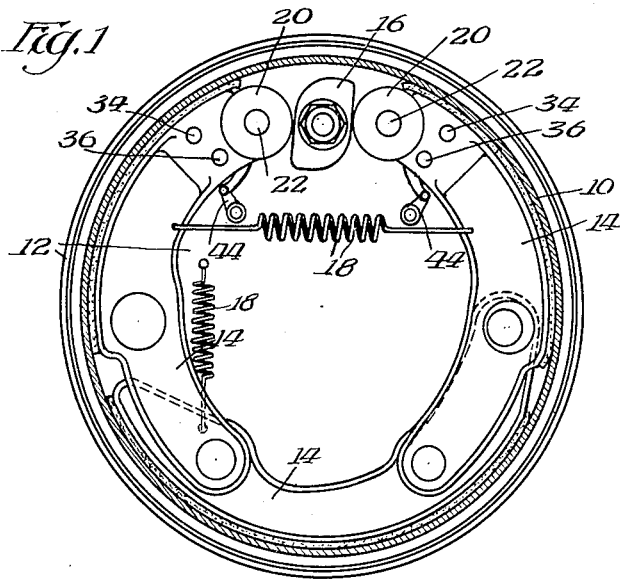
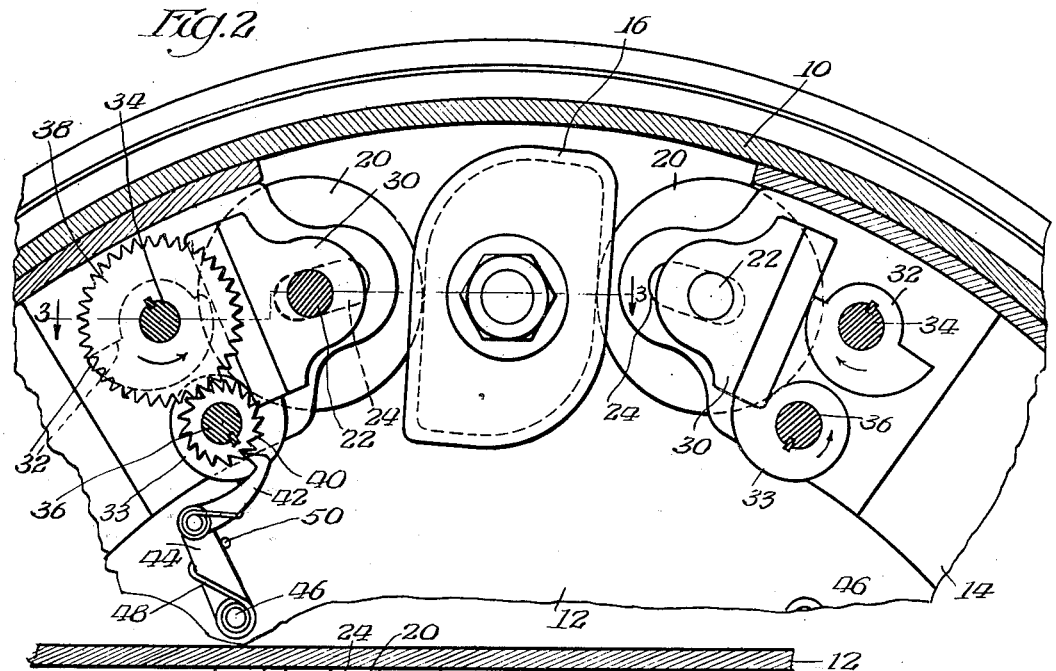
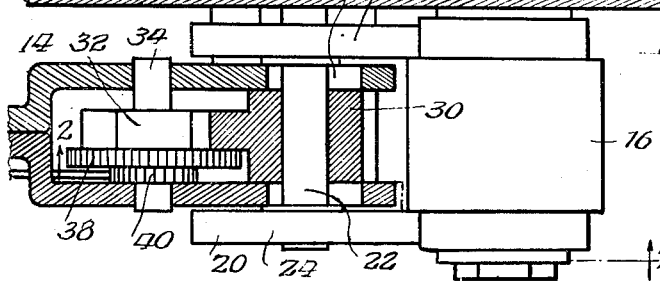
Inventor
KENNETH E. LYMAN
By M. W. McConkey
Atty

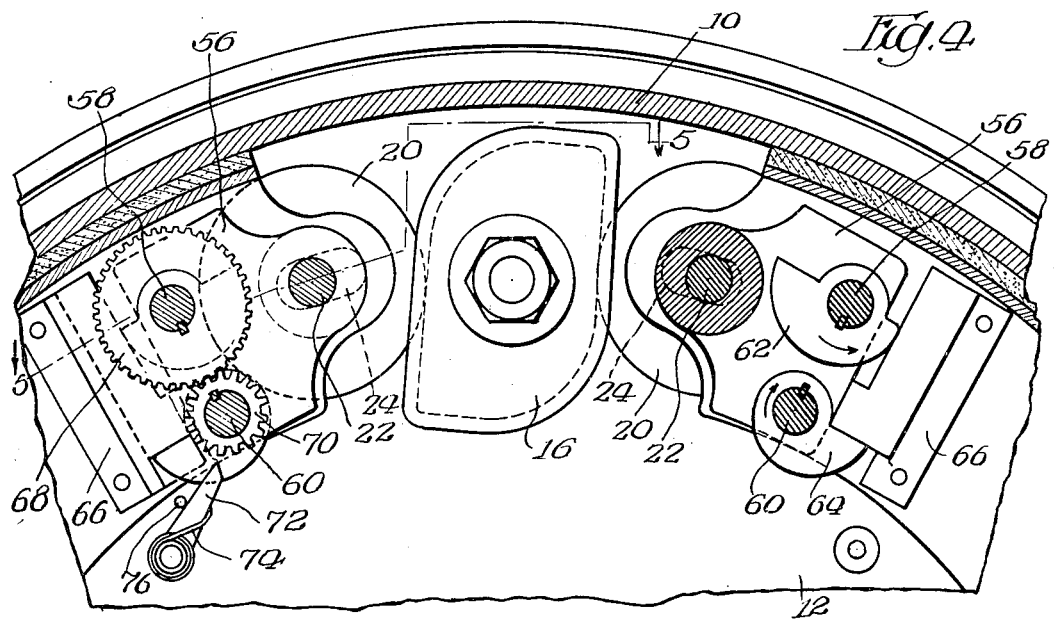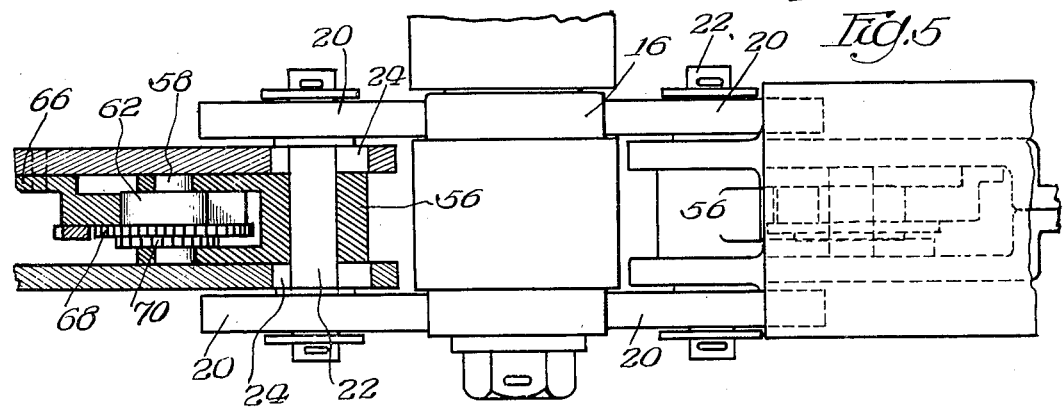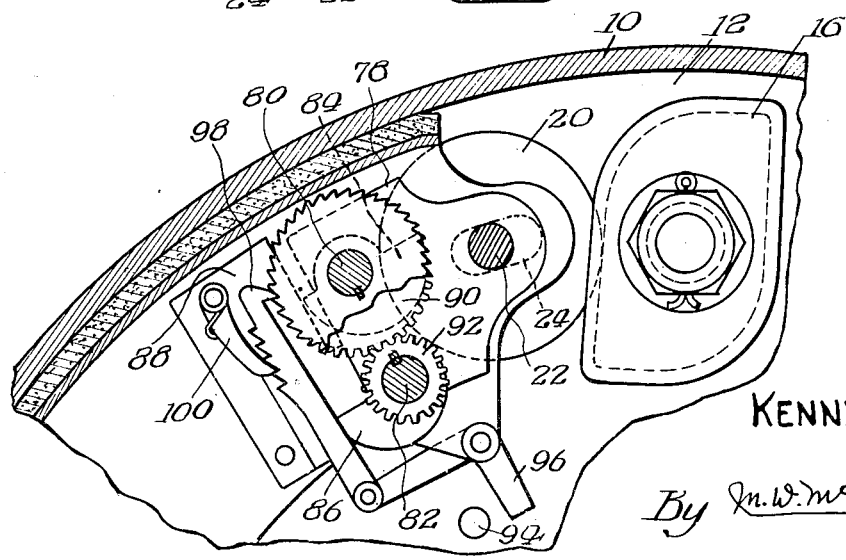

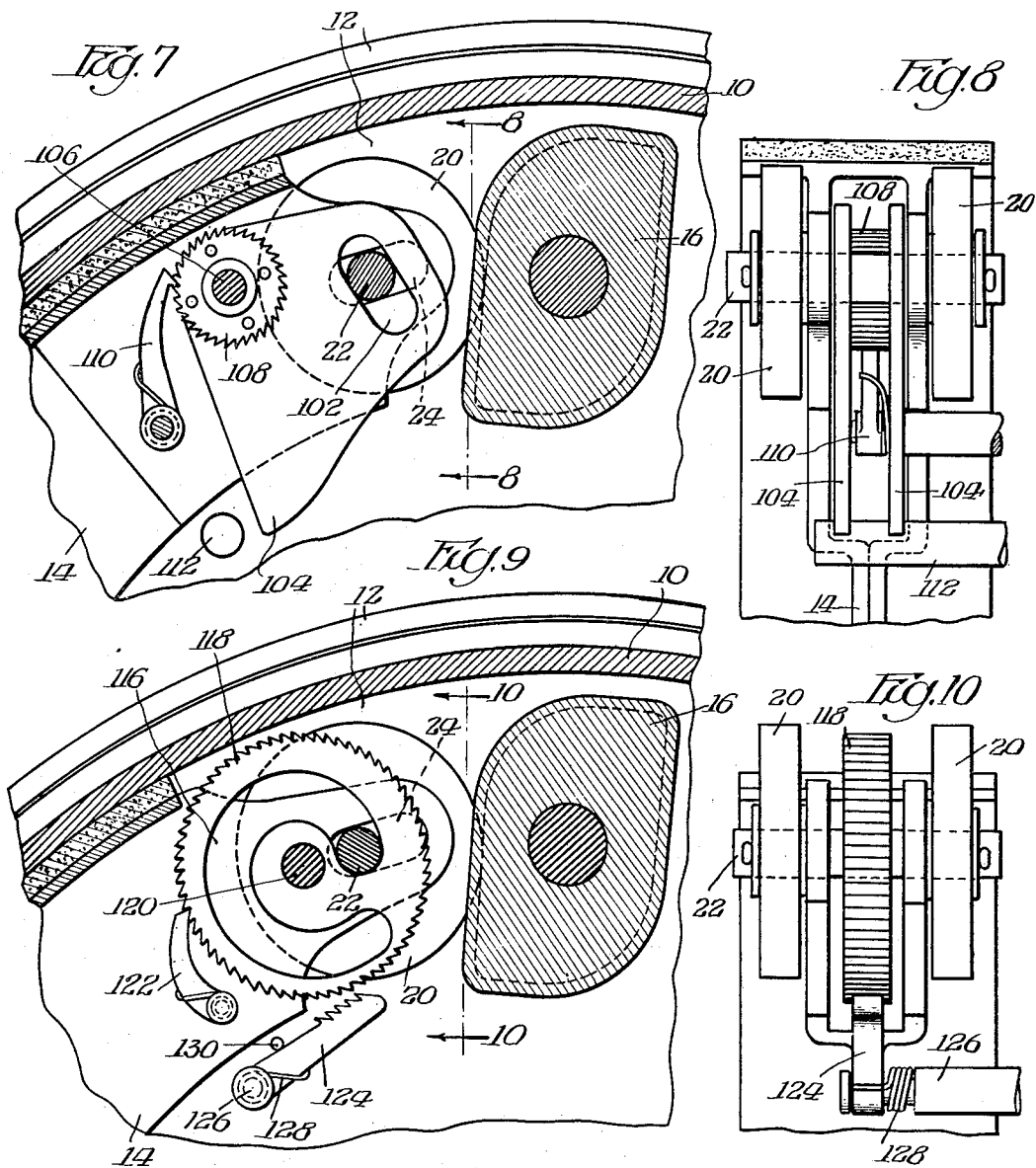

Aug. 30, 1932.  K. E. LYMAN  1,875,064
BRAKE
Filed Aug. 20, 1927  4 Sheets-Sheet 4
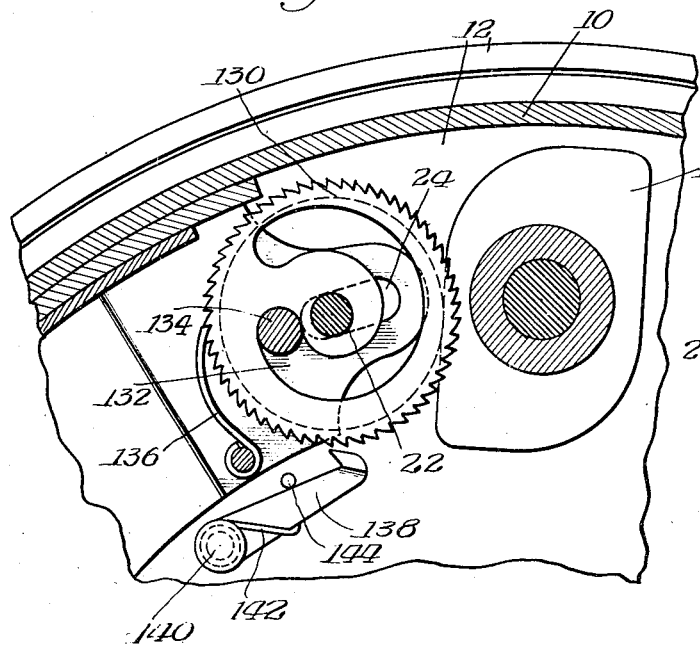
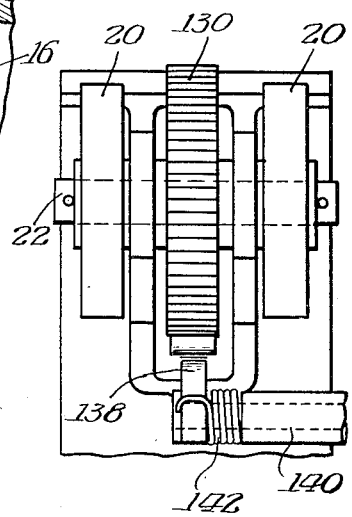
Inventor:
KENNETH E. LYMAN Patented Aug. 30, 1932

1,875,064

UNITED STATES PATENT OFFICE

KENNETH E. LYMAN, OF CHICAGO, ILLINOIS, ASSIGNOR TO BENDIX BRAKE COMPANY, OF SOUTH BEND, INDIANA, A CORPORATION OF ILLINOIS

BRAKE

Application filed August 20, 1927. Serial No. 214,280.

This invention relates to brakes and is illustrated as embodied in an internal expanding automobile brake. An important object of the invention is to provide automatically operated means for adjusting the brake for wear, preferably by shifting a thrust member such as a cam roller or the like to increase the effective length of the brake shoe or its equivalent to compensate for the wear.

Preferably the thrust member is adjusted by a cam, which in one form has a spiral cam slot and which in another form is an edge cam, and which gradually shifts the thrust device forward as the brake wears to compensate for the wear by gradually increasing the effective length of the shoe or other brake friction member. I prefer, in most embodiments of the invention, to provide a ratchet device for operating the cam or other means, for making the described adjustment.

The arrangement with a cam or other means shifting one or more rollers and their mounting embodies substantial novelty independently of the automatic operation of the adjustment.

The above and other objects and features of the invention, including various novel combinations of parts and desirable particular constructions, will be apparent from the following description of a number of illustrative embodiments shown in the accompanying drawings, in which:

Figure 1 is a vertical section through the brake just inside the head of the brake drum and showing the brake shoes in side elevation;

Figure 2 is a view on a much larger scale of the free ends of the shoes and the applying mechanism, partly broken away to illustrate the operation of the applying mechanism;

Figure 3 is a partial section through the applying mechanism on the line 3—3 of Figure 2;

Figure 4 is a view corresponding to Figure 2 but showing a different form of adjusting mechanism;

Figure 5 is a view corresponding to Figure 3 but taken on the line 5—5 of Figure 4;

Figure 6 is a view corresponding to part of Figure 4 but showing a third form of adjusting mechanism;

Figure 7 is a similar view of a fourth form of adjusting mechanism;

Figure 8 is an end elevation of the shoe of Figure 7, looking in the direction of the arrows 8—8 in Figure 7;

Figure 9 is a view corresponding to Figure 7 but showing a fifth modification of the invention;

Figure 10 is an end elevation of the shoe of Figure 9 looking in the direction of the arrows 10—10 in Figure 9; and Figures 11 and 12 are views of a sixth modification corresponding respectively to Figures 7 and 8 or 9 and 10.

The illustrated brake includes a rotatable drum 10, at the open side of which is arranged a suitable support such as a backing plate 12 and within which is arranged the friction means of the brake which in this particular design includes three brake shoes 14 applied by means such as a double cam 16 against the resistance of return springs 18. This particular brake is substantially as more fully described in Patent No. 1,567,716, granted Bendix Brake Company on December 29, 1925, on an application of A. Y. Dodge.

An important feature of the present invention relates to automatically adjusting for wear of the brake by shifting a novel thrust device which preferably includes a pair of thrust rollers 20 on a spindle 22 and engaging the applying cam 16. The cam 16 may be formed with a central rib as shown, which projects between the rollers 20 of each brake shoe to prevent lateral movement of the shoe. Each of the spindles 22 is arranged in a slot 24 in the end of its shoe so that it is confined to prevent movement crosswise of the shoe but is free to have some movement lengthwise of the shoe.

In the arrangement of Figures 1, 2, and 3, each of the spindles 22 carries a fitting 30 arranged in a recess in the end of the shoe and which is engaged by an adjusting means such as two edge cams 32 and 33 mounted respectively on spindles 34 and 36 journalled in the end of the shoe. The spindle 34 is formed with a pinion 38 meshing with a smaller pinion 40 on the spindle 36, thus coordinating the movement of the two cams 32 and 34 and controlling the movement of the fitting 30 which shifts the thrust device including the spindle 22 and the two rollers 20.

The pinion 40 is formed with ratchet teeth on one end for engagement with a spring-pressed pawl 42 pivotally mounted on an arm 44 fulcrumed on a pivot 46 on the backing plate 12 and urged by a spring 48 against a stop 50.

In operation, the brake-applying force from the cam 16 is transmitted through the rollers 20 and the spindles 22 and through the cams 32 and 34 and their spindles to the shoes. As the brake wears in service, the shoes will gradually be forced further apart by the cam when the brake is applied, until finally the two pawls 42 snap over the next teeth of the ratchets on the spindles 36, whereupon the release of the brake will operate the ratchets to turn the cams 32 and 34 to shift the rollers 20 to increase the effective lengths of the shoes sufficiently to compensate for the wear of the brake.

In a general way, the arrangement of Figures 4 and 5 differs from that of Figures 1, 2, and 3, in that the adjusting cams and their operating means are mounted on the fitting which carries the roller spindle, and act against the shoe, instead of being carried by the shoe and acting against the fitting. In this arrangement the fitting 56 carrying roller spindle 2 is forked to form supports for the spindles 58 and 60 of the edge cams 62 and 64 engaging an abutment or bracket 66 riveted or otherwise secured in the recess at the end of the shoe. Spindle 58 carrying the cam 62 is formed with a pinion 68 meshing with a pinion 70 on the spindle 60, the pinion 70 having (as before) ratchet teeth arranged to be engaged, when the brake is worn, by a pawl 72 urged by a spring 74 against a fixed stop 76.

In either of the above modifications the cams or their equivalents may be held in their adjusted positions by the friction of the parts, as illustrated, or suitable holding pawls may be provided as shown in Figure 9 if desired.

The arrangement of Figure 6 is the same as that of Figures 4 and 5 in that the fitting 78 carrying the spindle 22 of the rollers 20 also carries the spindles 80 and 82 of the edge cams 84 and 86 engaging the bracket 88 on the shoe. There are also the intermeshing pinions 90 and 92 on the spindles 80 and 82 respectively. In this case, however, the shifting of the cams is accomplished by a fixed stop 94 on the backing plate 12 which engages a bell-crank lever 96 pivoted on the fitting 78, in case of excessive wear of the brake. The rocking of the bell-crank lever 96 pulls downwardly on a pawl 98 engaging ratchet teeth formed on one side of the pinion 90. Return movement of the pawl 98 is prevented by an auxiliary pawl 100 which is spring-pressed against ratchet teeth formed on the back of the pawl 98.

In the arrangement of Figures 7 and 8, the spindle 22 of the rollers 20, or an equivalent part of a thrust device carried by the shoe, not only passes through the slots 24 in the shoe but also through slots 102 in cams 104 pivoted at 106 on the brake shoe. The cam members 104 are riveted or otherwise secured to opposite sides of a ratchet 108 mounted on the spindle 106 and engaged by a spring-pressed holding-pawl 110 to preserve the adjusted position of the spindle 22.

In this arrangement the cams 104 are operated by a fixed stop 112 on the backing plate 12 which is engaged by the lower ends of the cams in case of excessive wear of the brake, thus shifting the cams sufficiently to permit the pawl 110 to engage the next tooth of the ratchet 108. When the cams 104 are shifted in this manner, the cam slots 102 shift the spindles 22 forward to increase the effective length of the brake shoe to compensate for the wear.

In the arrangement of Figures 9 and 10, the spindle 22 is arranged in a spiral cam slot 116 in a member 118 pivoted on a spindle 120 carried by the shoe, the member 118 being formed on its periphery with ratchet teeth engaged by a spring-pressed holding-pawl 122. The adjustment in this arrangement is made by a pawl 124 mounted on a pivot 126 carried by the backing plate 12 and held by a spring 128 against the fixed stop 130. In case of excessive wear of the brake, the shoe is moved far enough by the cam 16 or its equivalent so that the pawl 124 will engage one of the teeth of the ratchet-and-cam member 118 so that when the brake is released the return springs will cause the ratchet-and-cam member 118 to turn one tooth with respect to the holding-pawl 122.

In a general way the arrangement of Figures 11 and 12 is the reverse of that of Figures 9 and 10 in that the ratchet-and-cam member in this case moves with the thrust device 20—22, and the spiral cam slot engages a fixed pin carried by the brake shoe. In the illustrated form the spindle 22 is merely a guide arranged in the slot 24 and the ratchet member 130 is fixed directly on the spindle 22. This member is formed with a spiral cam slot 132 embracing a transversely extending pin 134 carried by the brake shoe. The holding pawl 136 engaging the ratchet member 130 is in the form of a spring sufficiently flexible to follow the movement of the ratchet member. The operation in this case is by a pawl 138 mounted on a pin 140 carried by the backing plate 12 and held by a spring 142 against the fixed stop 144.

In case of excessive wear of the brake, the pawl 138 engages the ratchet 130 and when the brake is released the ratchet is turned sufficiently to permit the pawl 136 to engage the next tooth.

While several illustrative embodiments of the invention have been described in detail, it is not my intention to limit the scope of the invention to those particular embodiments or otherwise than by the terms of the appended claims.

I claim:

1. A brake friction member having at its end at least one thrust roller having a transverse spindle, in combination with a cam carried by the friction member and which is engaged by said spindle and which can be adjusted to shift the roller to compensate for wear of the friction member.

2. A brake friction member having at its end a pair of thrust rollers having a transverse spindle, in combination with means engaged by a part of the spindle between the rollers and which can be adjusted to shift the rollers.

3. A brake friction member having at its end a pair of thrust rollers having a transverse spindle, in combination with a cam engaged by a part of the spindle between the rollers and which can be adjusted to shift the rollers.

4. A brake friction member having a thrust device at one end having a transversely-extending part, in combination with an angularly-adjustable member having a spiral cam slot receiving said part.

5. A brake friction member having a thrust device at one end having a transversely-extending part, in combination with an angularly-adjustable member having a spiral cam slot receiving said part, said member being formed with ratchet teeth, together with a separately-mounted pawl engageable with said teeth.

6. A brake friction member having a thrust device at one end having a transversely-extending part, in combination with an angularly-adjustable member having a spiral cam engaging said part.

7. A brake element having a thrust roller at one end, and a cam for adjusting the roller bodily lengthwise of the element.

8. A brake element comprising two stampings spread apart at one end of said element, and having adjustable thrust means mounted at least in part between the spread-apart portions of the stampings.

9. A brake element comprising two stampings spread apart at one end of said element, and having thrust roller means at said end, and having means mounted at least in part between the spread-apart portions of the stampings for shifting the roller means bodily to adjust for wear.

10. A brake element comprising stampings spread apart at one end of the element, and having rollers at opposite sides with a transversely-extending pivot, together with a part between the spread-apart stampings and in which said pivot is mounted.

In testimony whereof, I have hereunto signed my name.

KENNETH E. LYMAN.